United States Patent [19]

Fejes et al.

[11] Patent Number: 4,654,187
[45] Date of Patent: Mar. 31, 1987

[54] METHOD AND A DEVICE FOR ANALYZING WATER IN THE PRIMARY CIRCUIT OF A NUCLEAR REACTOR

[75] Inventors: Peter Fejes, Västerås; Roland Ivars, Ransta, both of Sweden

[73] Assignee: AB Asea-Atom, Västerås, Sweden

[21] Appl. No.: 564,908

[22] Filed: Dec. 23, 1983

[30] Foreign Application Priority Data

Dec. 27, 1982 [SE] Sweden .................. 8207420

[51] Int. Cl.⁴ ............................. G21C 17/02
[52] U.S. Cl. .................... 376/245; 73/61.2
[58] Field of Search .......... 376/245, 308, 310, 313; 73/61.2, 86

[56] References Cited

U.S. PATENT DOCUMENTS

| | | | |
|---|---|---|---|
| 3,141,324 | 7/1964 | Boies et al. | 73/61.2 |
| 3,411,987 | 11/1968 | Fitzpatrick | 73/61.2 |
| 3,913,378 | 10/1975 | Hausler | 73/61.2 |
| 3,989,945 | 11/1976 | Cooper | 376/245 |
| 4,440,862 | 4/1984 | Cheng et al. | 73/61.2 |
| 4,526,045 | 7/1985 | Reekie | 376/245 |
| 4,532,103 | 7/1985 | Kitaguchi et al. | 376/310 |

FOREIGN PATENT DOCUMENTS 129872  1/1959  U.S.S.R. .................. 73/61.2

Primary Examiner—Deborah L. Kyle
Assistant Examiner—Richard Klein
Attorney, Agent, or Firm—Watson, Cole, Grindle & Watson

[57] ABSTRACT

The water flowing in a nuclear reactor is analyzed, while the reactor is in operation, by conducting water from the reactor vessel substantially without reduction in pressure or temperature past test surfaces (e.g. tubes) with different electrochemical potentials relative to the reactor water. Deposits formed on the test surfaces, which are substantially caused by colloidal particles in the water, are examined, preferably with regard to radioactive content.

6 Claims, 2 Drawing Figures

METHOD AND A DEVICE FOR ANALYZING WATER IN THE PRIMARY CIRCUIT OF A NUCLEAR REACTOR

BACKGROUND OF THE INVENTION

1. Field of the Invention

The present invention relates to a method and a device for characterizing or analyzing the water flowing in the primary circuit of a nuclear reactor (e.g. a boiling water reactor).

During operation of a nuclear reactor, corrosion products appear in the water in the primary circuit. The primary circuit in a boiling water reactor leads steam generated in the reactor vessel to a steam turbine, and from there to a condenser. Condensate formed in the condenser, after preheating, is returned to the reactor vessel. The primary circuit is a pressurized water reactor leads water heated in the reactor vessel to a steam generator and from there to the reactor vessel. For the most part, the corrosion products generated in the primary circuit of the reactor consist of oxides containing one or more metals of the kinds which are included in the construction of the primary circuit which is mainly iron, but further includes among other things, nickel, cobalt, chromium, manganese, titanium, molybdenum, zinc and zirconium. The corrosion products, which for the most part occur in a colloidal state, become radioactive due to the neutron flux in the reactor core. The concentration of these corrosion products in the water is extremely low, of the order of magnitude of ppb, that is, of the order of magnitude of $10^{-9}$ parts by weight per part by weight of water.

The amount of, and the type of, the corrosion products present are also affected by the temperature, particularly by the pH of the water and by the concentration of hydrogen and of oxygen dissolved in the water. The corrosion products are therefore indicators of important properties of the reactor water.

By examining the corrosion products in the reactor water, important conclusions can be drawn, among other things, concerning the pH of the reactor water, the degree of radioactive contamination in the primary circuit of the reactor and the degree of oxide growth in fuel tubes and channels of Zircaloy.

2. Description of the Prior Art

In previously known methods of analyzing water samples from nuclear reactors for characterizing the water-chemical conditions in the reactor, the water has been cooled down to room temperature in special sampling systems, and physical, chemical and radioactive properties in the cooled water have then been determined. The results of analyses according to these methods are, in most respects, not representative of the conditions actually prevailing inside the reactor at its operating temperature when the solubilities and equilibrium conditions are quite different from those existing at room temperature.

OBJECTS OF THE INVENTION

One object of the present invention is to make it possible to characterize the water flowing in a reactor vessel of a nuclear reactor under conditions which prevail in the reactor vessel during operation.

A further object of the invention is to provide a method and device for monitoring the compounds flowing with the water in the primary circuit of a nuclear reactor to give information as to the corrosion rates existing in the reactor vessel.

SUMMARY OF THE INVENTION

According to one aspect of the invention, there is provided a method of characterizing the water flowing in a reactor vessel of a nuclear reactor, which is characterized in that water from the reactor vessel of the nuclear reactor, while the reactor is in operation, is led, without substantial reduction in pressure or temperature, past a plurality of test surfaces located outside the reactor vessel, these surfaces having different electrochemical potentials relative to the water, for a period of time sufficient to cause a deposition to occur on at least one of the test surfaces, and in that the deposition on the at least one test surface is examined to determine at least one constituent of the water.

BRIEF DESCRIPTION OF THE DRAWING

The invention will now be described in greater detail, by way of example, with reference to the accompanying drawing, wherein FIG. 1 schematically shows a boiling water reactor with a primary circuit and with a device for characterizing the reactor water according to the method of the present invention.

DESCRIPTION OF THE PREFERRED EMBODIMENT

Figure 1:
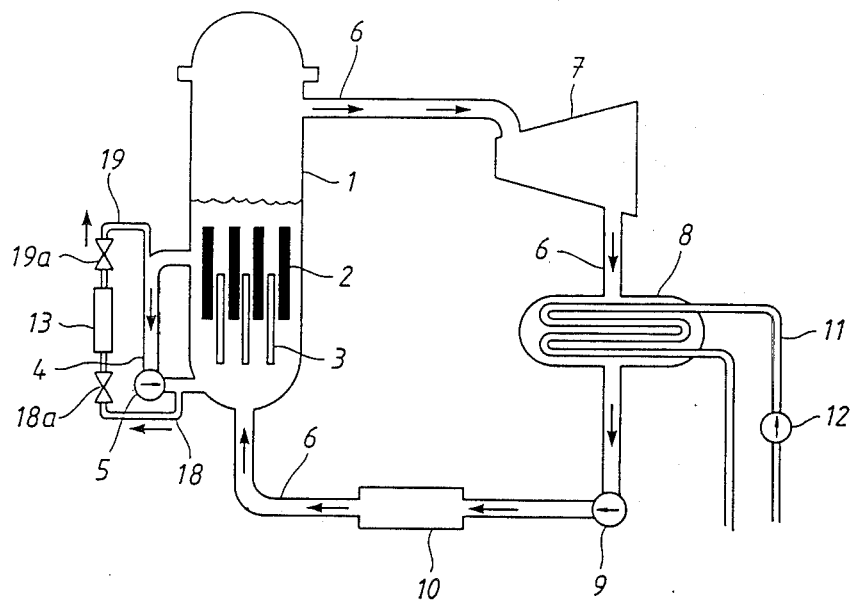

The boiling water reactor shown in FIG. 1 has a reactor vessel 1 with a core containing fuel elements 2 and control rods 3 and with a plurality of main coolant circulation circuit, one such circuit being shown at 4 in the Figure. Each main circulation circuit has a pump 5. The task of the pumps 5 is to see that the reactor core at all times receives sufficient cooling to maintain the core temperature within safe operating limits. In addition to the reactor vessel 1, the reactor includes a primary circuit 6 which includes, among other things, a steam turbine 7, a condenser 8, pump means 9 and a preheater 10. Steam generated in the reactor core delivers its energy to the rotor of the turbine 7 and is condensed, after passage through the turbine, in the condenser 8 by heat-exchange with cooling water flowing in a circuit 11 containing a pump 12. The condensate from the condenser 8 is fed, after preheating in the preheater 10, back into the reactor vessel by the pump means 9.

Figure 2:
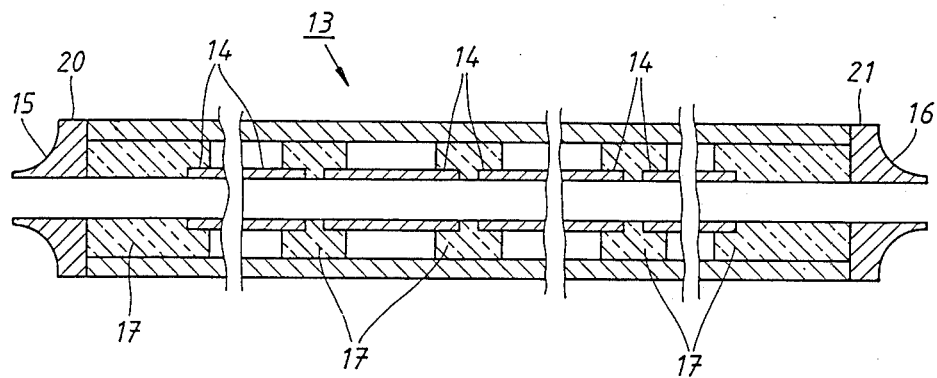
FIG. 2 shows the device used in the reactor of FIG. 1 in section and on an enlarged scale.

In accordance with the invention, an autoclave 13 (shown considerably enlarged in FIG. 1) for characterization of the reactor vessel is connected in one of the coolant circulation circuits 4, and in that way is indirectly connected to the reactor vessel 1. Alternatively, the autoclave 13 may be directly connected to the reactor vessel 1. The outlet of the autoclave 13 may be connected directly to the reactor vessel, or indirectly thereto via the remainder of the coolant circulation circuit (as shown in FIG. 1) or via another point in the primary circuit or to a drainage system or to an exhaust. As will be clear from FIG. 2, the autoclave, which is preferably of austenitic steel, comprises a number of tubes 14 (test surfaces) having different electrochemical potentials in relation to the reactor water. Between the test surfaces and between these and the inlet 15 and outlet 16 of the autoclave, electrically insulating, tubular spacers 17 are arranged. The spacers 17 can be made, for example, of zirconium dioxide. In one particular case (given by way of example) seven tubes 14 are used and in successive order from the inlet to the outlet the test surfaces consist of nickel, chromium, platinum, graphite, quartz, austenitic stainless steel (Swedish Standard 2333) and titanium. All the tubes 14, the inlet 15, the outlet 16 and the central region of each spacer 17, have the same internal diameter as conduits 18 and 19 which provide the inlet from and the return to the main coolant circuit of the reactor. The parts 14–19 thus form together a coherent channel for the water with the same cross-section throughout. With this embodiment, the material transportation conditions from the water to the test surfaces are very well-defined, and therefore the deposit of products on the test surfaces is, in all essential respects, determined by the electrochemical conditions. The autoclave 13 is provided with end walls 20 and 21, the end wall 21 being removable to allow the parts 14 and 17 to be withdrawn from the autoclave after removal of the end wall 21.

After the test surfaces 14 have been exposed for some time, for example 2 weeks, to the reactor water which is led through the tubes 14 while the reactor is in operation, that is, with shut-off valves 18a and 19a in the conduits 18 and 19, respectively, open, the valves 18a and 19a are closed. The tubes 14 are removed from the autoclave 13 and the amount of radioactive products which have become deposited on the different test surfaces and which substantially are derived from colloidal particles with different electric charge, is determined by measuring the radioactivity of the different test surfaces. The measurement results thus obtained provide information about the properties of the reactor water under the current operating conditions of the reactor. The results can be used for a number of different purposes. By making repeated determinations of the kind described, changes in the properties of the reactor water can be continuously monitored. It can then be established, when a change in the reactor water is noted, what has caused that change and to take early steps to eliminate the cause of that change.

The method and device according to the invention can, of course, also be used for investigating, from the elements detected in the reactor water, how corrosion within the reactor is affected by varying the operating conditions of the reactor.

In addition to the determination of radioactive contents, the examination of the products deposited on the test surfaces also permit other chemical and physical tests to be made in order to further establish the nature of the depositions, thus making it possible to monitor the corrosion of particular parts in the reactor in more detail, such as, for example, the oxide growth on those parts made of Zircaloy. A chemical analysis of the constituents of a deposition can be made to shed light on processes (physical or chemical) occurring in the reactor.

It will be apparent that the specific embodiment described above and illustrated in FIG. 2 can be modified in many ways within the spirit and scope of the invention as defined in the following claims.

What is claimed is:

1. A method of analyzing the water which flows in a primary coolant circuit of a nuclear reactor which is in operation, said method comprising the steps of
   (1) feeding water from the primary coolant circuit, without any substantial reduction in pressure or temperature, past a plurality of test surfaces which are electrically insulated from one another, which have different electrochemical potentials relative to the water, and which are made from at least two materials selected from the group consisting of nickel, chromium, platinum, graphite, quartz, titanium and stainless steel, for a period of time sufficient to cause depositions to occur on said test surfaces, and
   (2) examining said depositions on said test surfaces to determine the properties of the water.

2. A method as claimed in claim 1, wherein in step (2) the examining comprises determining the radioactive content of said depositions.

3. In a nuclear reactor which includes a primary coolant circuit through which water flows, a device for analyzing the water flowing through said primary coolant circuit which comprises an autoclave which is sealingly connected to said primary coolant circuit; a plurality of tubes arranged in spaced apart fashion within said autoclave along its length, said tubes having different electrochemical potentials relative to the water which flows through said autoclave and being made from at least two materials selected from the group consisting of nickel, chromium, platinum, graphite, quartz, titanium and stainless steel; and a plurality of electrically-insulating spacers which are respectively positioned between said spaced apart tubes.

4. A device as claimed in claim 3, wherein said electrically-insulating spacers are disposed within said autoclave.

5. A device as claimed in claim 4 wherein all of said tubes have equal internal diameters, wherein all of said spacers have equal internal diameters, and wherein the internal diameters of said spacers are equal to the internal diameters of said tubes.

6. A device as claimed in claim 3, wherein said autoclave has an upstream end and a downstream end, and wherein said device includes first means for delivering water flowing in said primary coolant circuit to the upstream end of said autoclave and second means for delivering water away from the downstream end of said autoclave, and wherein each of said first and second delivery means include shut off valves therein for isolating said autoclave from the primary coolant circuit.

* * * * *